United States Patent Office 3,105,831
Patented Oct. 1, 1963

3,105,831
2β,3α-DIMERCAPTO-17β-HYDROXY-5α-ANDRO-
STANE AND DERIVATIVES THEREOF
Taichiro Komeno, Sumiyoshi-ku, Osaka-shi, Japan, assignor to Shionogi & Co., Ltd., Osaka, Japan
No Drawing. Filed Dec. 17, 1962, Ser. No. 244,901
Claims priority, application Japan Dec. 19, 1961
10 Claims. (Cl. 260—239.5)

This invention relates to 2β,3α-dimercaptosteroids and derivatives thereof. More particularly, it relates to 2β,3α-dimercaptoandrostanes and derivatives thereof which are represented by the formula:

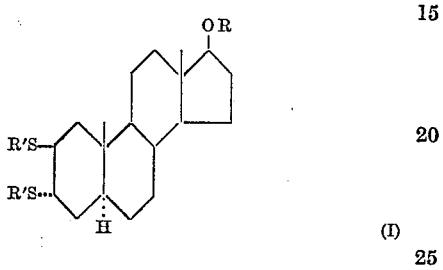

(I)

wherein R is a hydrogen atom or a lower alkanoyl group (e.g. acetyl, propionyl, butyryl), R' is a hydrogen atom or a lower alkanoyl group (e.g. acetyl, propionyl, butyryl) and, when both R' are linked together, they represent a group of the formula:

wherein R'' and R''' each represents a hydrogen atom or a lower alkyl group (e.g. methyl, ethyl, propyl, butyl).

It is an object of the present invention to embody 2β,3α-dimercaptosteroids. Another object of this invention is to embody a generally applicable process for the conversion of a steroidal cyclic trithiocarbonate into the corresponding 2β,3α-dimercaptosteroid. A further object of this invention is to embody the said 2β,3α-dimercaptoandrostanes and derivatives thereof which possess physiological activities. These and other objects will be apparent to those conversant with the art to which the present invention pertains from the subsequent description.

The process of the present invention is representable by the following scheme:

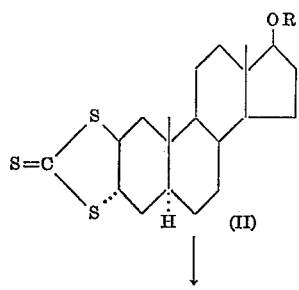

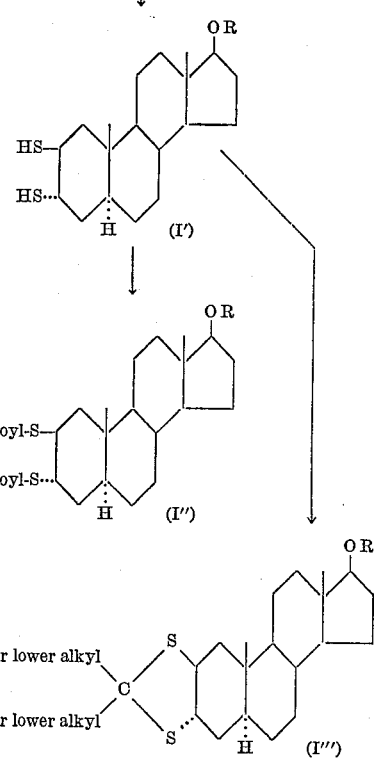

wherein R has the same significance as designated above.

The starting cyclic trithiocarbonate II is novel and can be prepared from the corresponding 2,3-epoxysteroid according to the following reaction scheme:

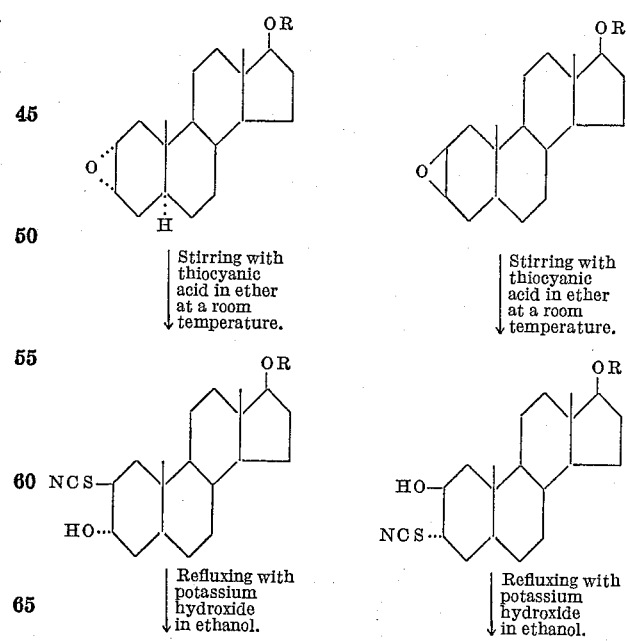

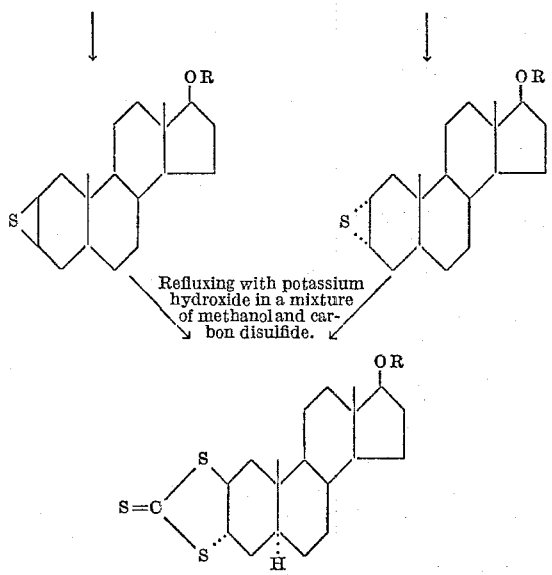

wherein R has the same significance as designated above.

According to the process of the present invention, the starting cyclic trithiocarbonate II is subjected to reductive ring-fission by treatment with a reducing agent. As the reducing agent, there may be employed metallic hydride such as lithium aluminum hydride, lithium borohydride, sodium aluminum hydride and sodium borohydride. The reaction may be carried out under the condition which is usually adopted when the said reducing agent is employed. For instance, the reaction can readily proceed by stirring the starting cyclic trithiocarbonate II with metallic hydride in an inert organic solvent such as ether, tetrahydrofuran and dioxane at a room temperature (10 to 30° C.) or while refluxing. The resulting 2β,3α-dimercaptoandrostane I' may be then subjected to acylation or acetalation as to the mercapto groups. Both acylation and acetalation can be accomplished per se conventional procedures. For instance, the acylation is executed by heating the 2β,3α-dimercaptoandrostane I' with a lower alkanoic anhydride such as acetic anhydride and propionic anhydride in the presence of a base such as pyridine, picoline and collidine on a water bath. The acetalation can be performed, for example, by refluxing the same with a carbonyl compound such as acetaldehyde, propionaldehyde, acetone and diethyl ketone in the presence of an acid such as sulfuric acid and p-toluenesulfonic acid.

The thus-prepared 2β,3α-dimercaptoandrostanes and derivatives thereof of Formula I are useful as antagonists to hormonic substances. For example, 2β,3α-diacetylthio-5α-androstan-17β-ol 17-acetate produced inhibition of gonadotropin secretion at a total dose of 10 milligrams in the test using mice. Further, 2β,3α-dimercapto-17β-acetyloxy-5α-androstane 2,3-acetonide inhibited the action of testosterone propionate and produced significant decreases of levator ani muscle weight in the test using rats. The other products of this invention show similar physiological activities.

Hereupon, it may be noted that the said reductive ring-fission process per se of the present invention is novel and can be generally applied to the production of the 2β,3α-dimercaptosteroids of androstane series, pregnane series, cholane series, cholestane series and spirostane series from the corresponding cyclic trithiocarbonates. Thus, the process per se is representable by the following formula showing only the A-ring of the steroid skeleton:

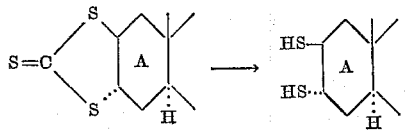

The following examples set forth illustratively presently-preferred embodiments of the invention. In these examples, mg.=milligram(s), g.=gram(s), and ml.= millilitre(s). Other abbreviations each have conventional significances.

*Example 1*

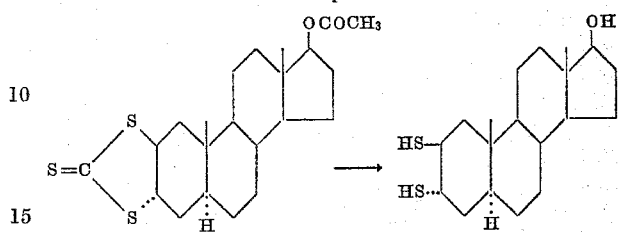

A solution of 17β-acetyloxy-5α-androstane-2β,3α-diol cyclic trithiocarbonate (724 mg.) in anhydrous tetrahydrofuran (25 ml.) is added dropwise to a suspension of lithium aluminum hydride (390 mg.) in tetrahydrofuran (10 ml.) while stirring, and the resultant mixture is stirred mildly for 2 hours while refluxing. Ice-water is added to the reaction mixture whereby excess of lithium aluminum hydride is decomposed. The resulting mixture is acidified with hydrochloric acid and shaken with chloroform. The chloroform extract is washed with an aqueous solution of sodium carbonate and water, dried and evaporated. The residue (637 mg.) is crystallized from methanol to give 2β,3α-dimercapto-5α-androstan-17β-ol (580 mg.) as colorless leaflets melting at 137 to 139° C. $[\alpha]_D^{21} = +33.7° \pm 2°$ (in chloroform).

IR: $\nu_{max}^{Nujol}$ cm.$^{-1}$: 3514, 1055

*Analysis.*—Calcd. for $C_{19}H_{32}OS_2$: C, 67.00; H, 9.47; S, 18.83. Found: C, 67.14; H, 9.53; S, 18.83.

*Example 2*

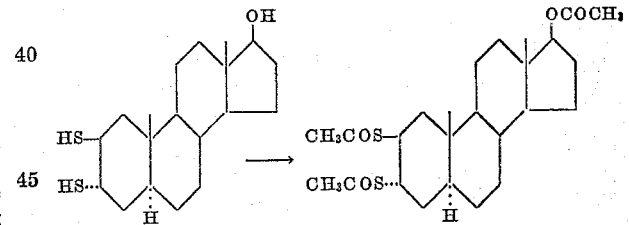

2β,3α-dimercapto-5α-androstan-17β-ol (138 mg.) is heated with pyridine (1 ml.) and acetic anhydride (1 ml.) for 2 hours on a steam bath. To the reaction mixture, there is added water. The precipitate is collected by filtration and crystallized from methanol to give 2β,3α-diacetylthio-5α-androstan-17β-ol 17-acetate (119 mg.) as leaflets melting at 184 to 186° C. $[\alpha]_D^{21} = -23.8° \pm 2°$ (in chloroform).

UV: $\lambda_{max}^{ethanol}$ 232 mμ (ε: 8,940). IR: $\nu_{max}^{Nujol}$ 1742, 1242, 1046, 1028, 1703 (shoulder), 1695, 1136, 1120 cm.$^{-1}$

*Analysis.*—Calcd. for $C_{25}H_{38}O_4S_2$: C, 64.34; H, 8.21; S, 13.74. Found: C, 64.66; H, 8.29; S, 13.63.

*Example 3*

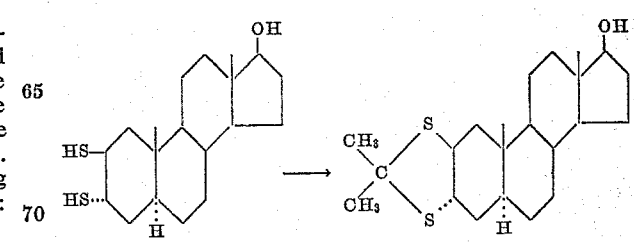

A solution of 2β,3α-dimercapto-5α-androstan-17β-ol (388 mg.) and p-toluenesulfonic acid hydrate (40 mg.) in acetone (10 ml.) is refluxed for 7 hours. To the reaction mixture, there is added water, and the precipitated crystals are collected by filtration and recrystallized from methanol to give 2β,3α-dimercapto-17β-hydroxy-5α-androstane 2,3-acetonide (290 mg.) as needles melting at 184 to 186° C. $[\alpha]_D^{21}=+61.8°\pm2°$ (in chloroform).

IR: $\nu_{max.}^{chloroform}$ 1369, 3628 cm.$^{-1}$

*Analysis.*—Calcd. for $C_{22}H_{36}OS_2$: C, 69.41; H, 9.53; S, 16.85. Found: C, 69.15; H, 9.54; S, 16.89.

*Example 4*

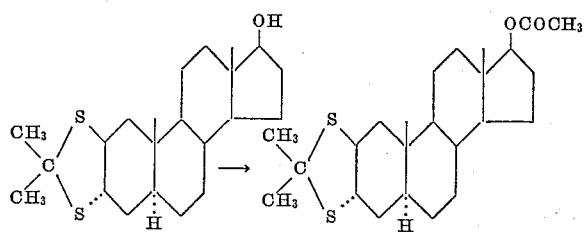

A solution of 2β,3α-dimercapto-17β-hydroxy-5α-androstane 2,3-acetonide (213 mg.) in a mixture of pyridine (2 ml.) and acetic anhydride (1 ml.) is heated for 2 hours on a steam bath. To the reaction mixture, there is added water, and the precipitated crystals are collected by filtration and recrystallized from methanol to give 2β,3α-dimercapto - 17β - acetyloxy-5α-androstane 2,3-acetonide (200 mg.) as needles melting at 174 to 175° C. $[\alpha]_D^{21}=+53.0°\pm2°$ (in chloroform).

IR: $\nu_{max.}^{Nujol}$ 1736, 1247, 1030 cm.$^{-1}$

*Analysis.*—Calcd. for $C_{24}H_{38}O_2S_2$: C, 68.19; H, 9.06; S, 15.17. Found: C, 68.22; H, 9.12; S, 15.10.

What is claimed is:

1. A 2β,3α-dimercaptoandrostane having the following formula:

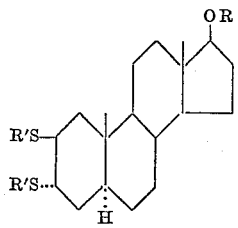

wherein R is a member selected from the group consisting of a hydrogen atom and a lower alkanoyl group, R' is a member selected from the group consisting of a hydrogen atom and a lower alkanoyl group and, when both R' are linked together, they represent a group of the formula:

wherein R″ and R‴ each represent a member selected from the group consisting of a hydrogen atom and a lower alkyl group.

2. 2β,3α-dimercapto-5α-androstan-17β-ol.
3. 2β,3α-diacetylthio-5α-androstan-17β-ol 17-acetate.
4. 2β,3α-dimercapto - 17β - hydroxy-5α-androstane 2,3-acetonide.
5. 2β,3α - dimercapto-17β-acetyloxy-5α-androstane 2,3-acetonide.
6. Process for preparing a 2β,3α-dimercaptosteroid which comprises reacting a steroid of the formula

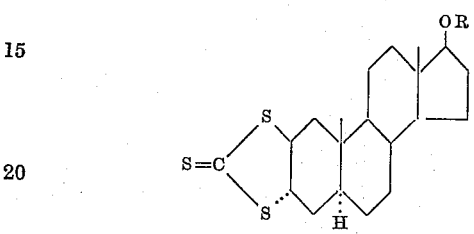

wherein R is a member selected from the group consisting of H and lower alkanoyl, with a metallic hydride in an inert organic solvent to give a steroid of the formula

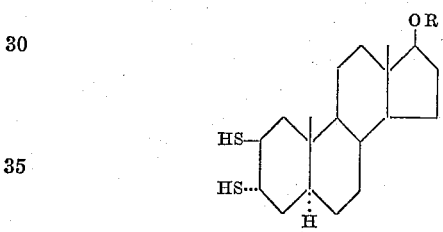

wherein R has the same significance as precedingly recited.

7. Process according to claim 6, herein the reaction is carried out at room temperature.
8. Process according to claim 6, wherein the reaction is carried out while refluxing.
9. Process according to claim 6, wherein lithium aluminum hydride is employed as the metallic hydride.
10. Process according to claim 6, wherein the reaction is carried out in an inert organic solvent selected from the group consisting of ether, tetrahydrofuran, dioxane and a mixture thereof.

References Cited in the file of this patent

Lightner et al.: "Chemistry and Industry," No. 27, July 7, 1962, pp. 1236–1237.